United States Patent
Schmitt (10) Patent No.: US 8,752,483 B2
(45) Date of Patent: Jun. 17, 2014

(54) MACHINE FOR TYING PLANTS, IN PARTICULAR THE BRANCHES OF VINES

(76) Inventor: Modeste Schmitt, Pfaffenheim (FR)

( * ) Notice: Subject to any disclaimer, the term of this patent is extended or adjusted under 35 U.S.C. 154(b) by 342 days.

(21) Appl. No.: 12/864,886

(22) PCT Filed: Jan. 29, 2009

(86) PCT No.: PCT/FR2009/000100
§ 371 (c)(1),
(2), (4) Date: Jul. 28, 2010

(87) PCT Pub. No.: WO2009/112699
PCT Pub. Date: Sep. 17, 2009

(65) Prior Publication Data
US 2011/0005634 A1    Jan. 13, 2011

(30) Foreign Application Priority Data
Feb. 12, 2008  (FR) ...................... 08 00731

(51) Int. Cl.
*A01F 15/14*   (2006.01)
*A01G 17/08*   (2006.01)

(52) U.S. Cl.
USPC ............................. 100/8; 140/113; 47/1.01 S (58) Field of Classification Search
USPC ................... 100/6, 7, 8, 13, 17, 18; 140/113; 47/1.01 S
See application file for complete search history.

(56) References Cited

U.S. PATENT DOCUMENTS

| 5,388,504 A * | 2/1995 | Kluver ............................... 100/4 |
| 6,341,476 B2 * | 1/2002 | Golightly ........................ 53/582 |
| 2007/0210134 A1 * | 9/2007 | Oda et al. ...................... 227/131 |

FOREIGN PATENT DOCUMENTS

| FR | 2 723 289 A1 | 2/1996 |
| FR | 2723289 A1 * | 2/1996 |

* cited by examiner

*Primary Examiner* — Jimmy T Nguyen
(74) *Attorney, Agent, or Firm* — Davis & Bujold, PLLC; Michael J. Bujold (57) ABSTRACT

A machine (1) for tying vegetation, in particular vine, raspberry or similar branches, including a unit (4) for lifting up the branches, an element (5) for supplying tying-up wires (50) and members (7, 8) for binding the tying-up wires. These binding members include two pivoting arms (7, 8) that are mounted to pivot around vertical axes (A) and be moved by jacks. One of the arms (7) comprises an on-board tie magazine (71) that is arranged in the extension of a tying head (72), and the other arm (8) includes an insertion head (82) cooperating with the tying head (72) when the arms (7, 8) are in a working position in order to fit the tie (60) on the tying-up wires (50).

15 Claims, 6 Drawing Sheets

MACHINE FOR TYING PLANTS, IN PARTICULAR THE BRANCHES OF VINES

This application is a National Stage completion of PCT/FR2009/000100 filed Jan. 29, 2009, which claims priority from French patent application serial no. 08/00731 filed Feb. 12, 2008.

TECHNICAL AREA

The present invention relates to a machine for tying vegetation, in particular vine, raspberry or similar branches, including means for lifting up the branches, means for supplying tying-up wires and means for binding the tying-up wires, these binding means including two pivoting arms mounted around approximately vertical axes, these arms being coupled to driving means so as to be moved from a waiting position in which at least their ends are spaced apart to a working position in which the ends are brought together and arranged in order to fit a tie on the tying-up wires.

PRIOR TECHNIQUE

The most common tying technique is manual and requires tedious manual work to lift the vegetation, to position the tying-up wires on both sides of the vegetation and to tie or bind by any known means the tying-up wires together, at regular intervals or not. Some machines have been developed to carry out this work mechanically. Nevertheless, the mechanical lifting means used are relatively aggressive towards the vegetation, such as for example the lifting screws, which can tear off certain branches. The machine described in publication FR 2 723 289 has the advantage of using endless rubber belts which are inclined and stretched between two rollers of which one is driven in rotation. When these endless belts are driven, they are arranged in order to give a twisting effect to the vegetation, allowing the branches to lift naturally, without breaking them. This machine includes a fixed tie magazine housed in the frame of the machine, and two arms pivoting around vertical axes, one of the arms being equipped with a gripping head able to grip a tie in the magazine when the arm pivots and when its head is flush with the magazine. This tying mechanism is delicate and complex to implement since it requires an accurate setting of the position of the gripping head with respect to the magazine to ensure the proper gripping of the tie, this position being liable to misadjust itself in time, in particular under the effect of the vibrations from the tractor that carries the machine. The tying operation is thus not guaranteed, making this machine unreliable, and unsatisfying.

DISCLOSURE OF THE INVENTION

The present invention aims to solve these problems by offering a tying machine whose binding means are simple and fast to use, reliable and ensure correct and consistent tying.

For that purpose, the invention relates to a machine of the type described, characterized in that one of the arms includes an on-board tie magazine, arranged in the extension of a tying head, and the other arm includes an insertion head arranged to cooperate with the tying head when the arms are in working position in order to fit the tie on the tying-up wires.

So, the tie magazine is integrated in the tying arm, which allows ensuring an accurate and correct alignment that cannot become misadjusted, between the ties stored in this magazine and the tying head.

In a preferred embodiment, the tying head comprises a receiving area for a tie in communication with the tie magazine, followed by a tie fitting area, and a knife aligned with the areas, this knife being coupled with an actuating mechanism in order to be moved between a passive position, in which it lies upstream of the receiving area in order to be located behind the tie, and an active position, in which it lies at least partly in the receiving area and to move the tie from the receiving area to the fitting area.

In a most advantageous way, the actuating mechanism is actuated by the movement of the tying arm.

To that purpose, the actuating mechanism comprises a rack that is firmly attached to the knife, engaging a pinion, and an actuating rod connected at one of its ends to the pinion at a point out of center with respect to the axis of rotation of the pinion, and, at the other end, to a fixed point different from the pivoting axis of the arm, so that pivoting of the arm generates the movement of the knife.

The arms may advantageously comprise wire guides arranged to guide and position the tying-up wires with respect to the tying and insertion heads.

In the preferred embodiment, the tie magazine comprises means for pushing the ties towards the receiving area, these pushing means being arranged to apply an approximately constant thrust on the ties.

These pushing means comprise advantageously a pusher housed the magazine behind the ties and a system with pulleys and a cable, one end of the cable being fixed on the pusher and the other end carrying a counterweight.

BRIEF DESCRIPTION OF THE DRAWINGS

The present invention and its advantages will be better revealed in the following description of an embodiment given as a non limiting example, in reference to the drawings in appendix, in which.

ILLUSTRATIONS OF THE INVENTION AND BEST WAY OF REALIZING IT

Figure 1:
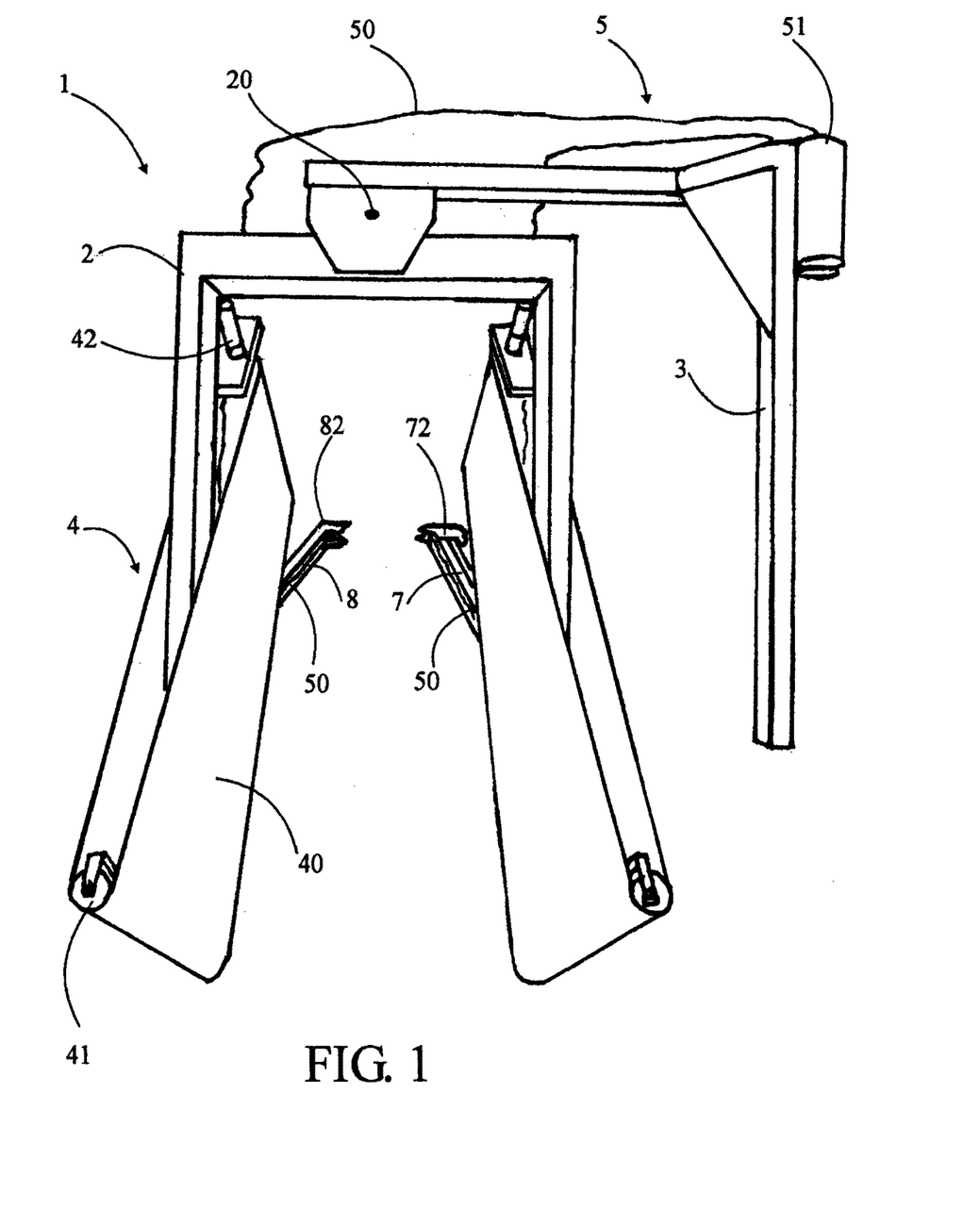
FIG. 1 is a front view of the machine according to the invention.
Figure 2:
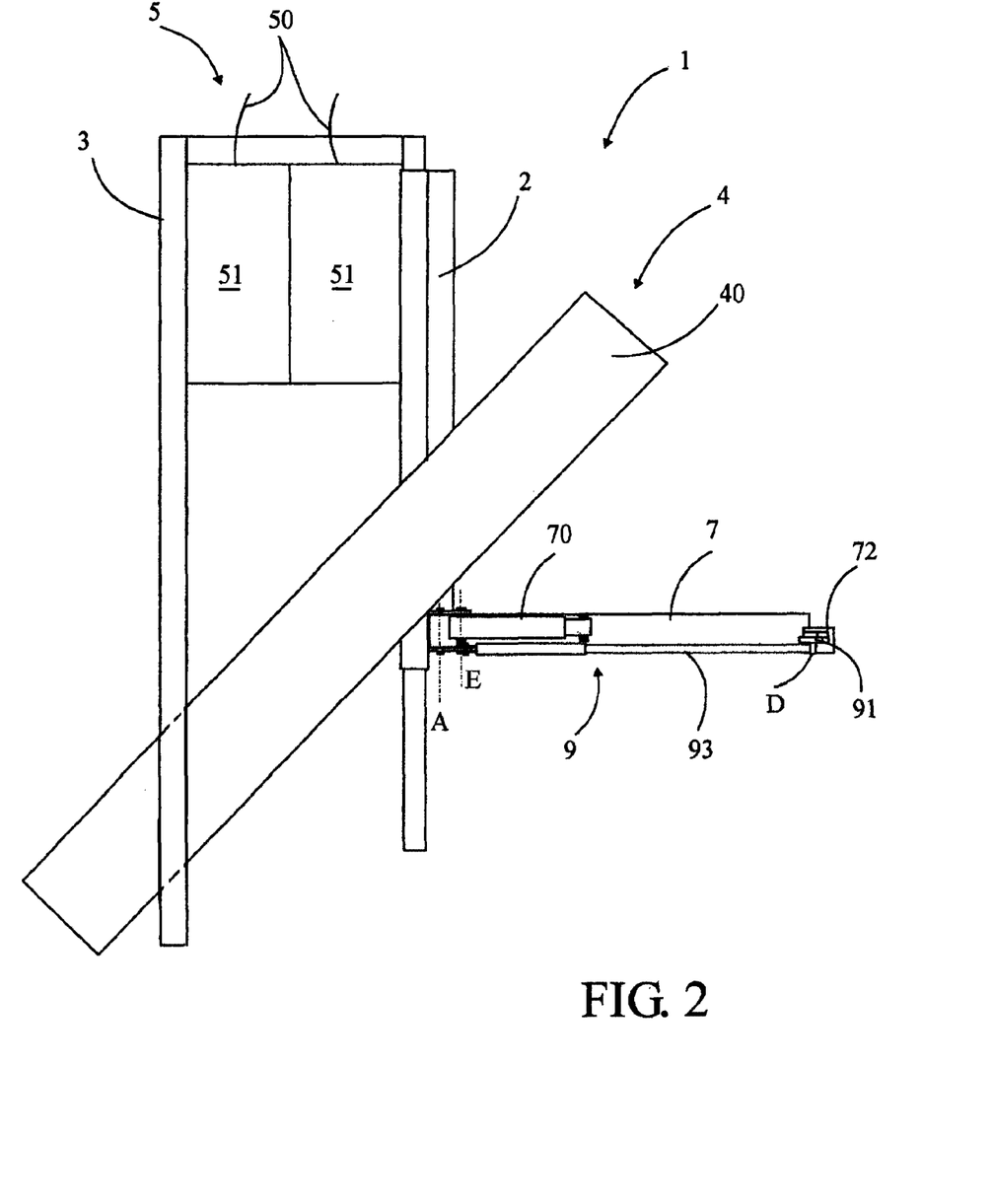
FIG. 2 is a side view of the machine of FIG. 1.

In reference to FIGS. 1 and 2, the tying machine 1 according to the invention is intended for tying the vegetation, in particular vine, raspberry and similar branches. It comprises a gantry 2 having the shape of a reversed U able to straddle a row of vegetation, this gantry 2 being suspended by means of a joint 20 on a beam 3 so as to have a certain freedom of movement allowing it to follow the row of vegetation. The legs of the gantry 2 may be fixed, as on the represented example, or mobile with respect to the upper crossbeam on carriages (not represented), so as to be able to adjust their opening and adapt to the width of a row of vegetation. The beam 3 is arranged so as to be mounted on an agricultural vehicle, a tractor or a similar vehicle (not represented). This machine 1 might also be integrated in an agricultural vehicle, dedicated exclusively to this tying function. Any other construction mode of the gantry 2 and of the beam 3 is of course possible. This machine 1 comprises lifting means 4 for the branches, feeding means 5 for the tying-up wire 50 and means 6 for binding these tying-up wires 50 at intervals generally determined by the operator.

In the represented example, the lifting means 4 comprise two endless belts 40 made in a flexible and adherent material such as rubber or a similar material, and whose surface may be structured with grooves, spikes or similar shapes or not. These endless belts 40 are mounted around two rollers 41, of which one is driven in rotation by a motor 42 or an equivalent device. The driving speed of the endless belts 40 is proportional to the speed of the tractor. They define between each other an open, V-shaped space to facilitate the penetration of the vegetation, they have an orientation that is inclined from the bottom to the top and each of them is slightly twisted from the outside towards the inside, with respect to the direction opposite to the direction of movement of the tractor. Any other lifting means may be considered. The endless belts 40 have the advantage that they allow lifting the vegetation softly, without causing important damages.

As the tractor advances, tying-up wires 50, strings, ribbons or similar items, are uncoiled from the feeding means 5 to be tightened on both sides of the vegetation, and then bound together at intervals that may be regular or not by the binding means 6 so as to maintain the vegetation in vertical position. In the represented example, the feeding means 5 comprise at least two wire spools 51 mounted on the beam 3 or at any other location of the machine 1, and able to deliver each at least one tying-up wire 50, for example out of polypropylene or a similar material. One may of course provide different feeding means 5, the important thing being that they allow automatic uncoiling of the tying-up wires by traction as the tractor advances.

Figure 8:
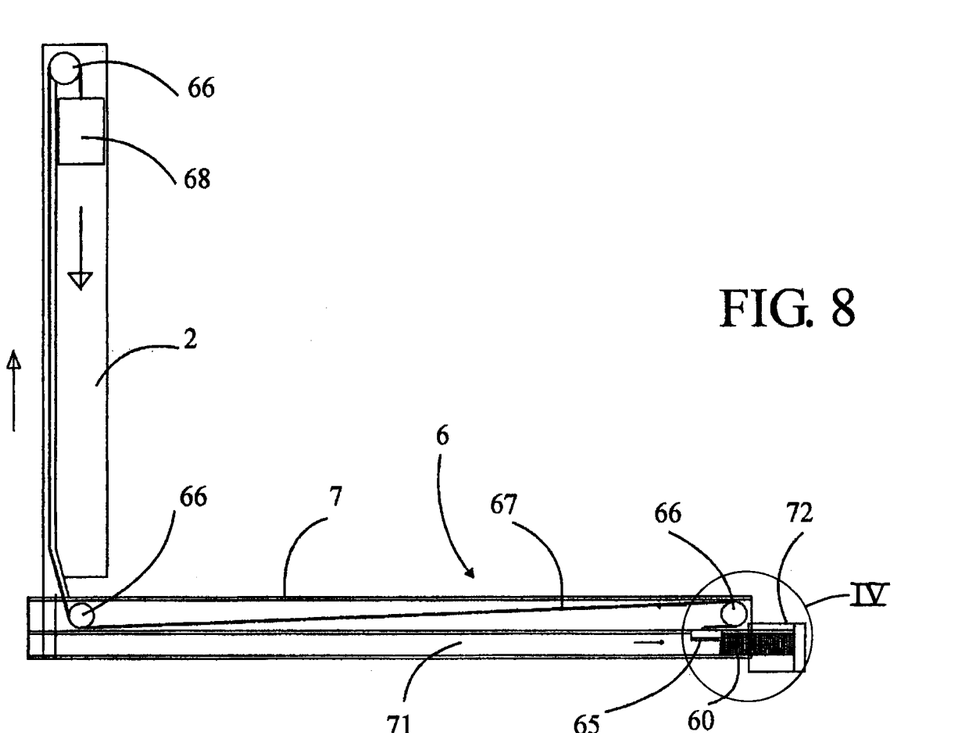
FIG. 8 is a view of the tie magazine and of its feeding system.
Figure 9:
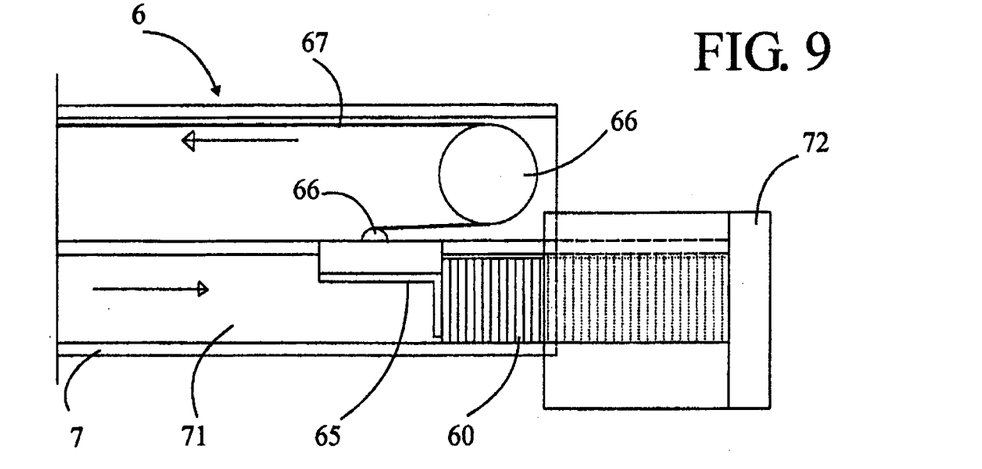
FIG. 9 is an enlarged view of detail IX of FIG. 8.

The binding means 6 comprise two pivoting arms 7, 8 mounted on the gantry 2 around approximately vertical axes A. They extend towards the back of the machine 1 and they are coupled with driving means 70, 80 to be moved from a waiting position, illustrated in continuous lines in FIG. 3, in which their ends are spaced apart, to a working position, illustrated in dash lines in FIG. 3, in which their ends are brought together and arranged in order to fit a tie 60 on the tying-up wires 50. In the shown example, the driving means consist in jacks 70, 80, for example hydraulic jacks, but they may consist of any other equivalent actuator. One of the ends of the jack 70, 80 is fixed on the gantry 2 and the other end on the arm 7, 8 so as to pivot the jack 70, 80 around its axis A. One of the arms 7 comprises an on-board tie magazine 71 (see FIG. 8, 9), arranged in the extension of a tying head 72, while the other arm 8 comprises an insertion head 82 arranged to cooperate with the tying head 72 when the arms 7 and 8 are in working position to fit the tie 60 on the tying-up wires 50 (see FIG. 4).

In reference to FIGS. 6 to 9, the tying head 72 comprises a receiving area 73 for a tie 60, which is in communication with the tie magazine 71, made up of a rail and containing a strip of ties 60 guided in translation in this rail. In reference to FIGS. 5A and 5B, the ties 60 have a parallelepiped outside shape that is complementary to the cross-section of the magazine 71, and an inside space 61a, 61b fitted with a lateral opening 62a, 62b for the introduction of the tying-up wires 50 and a retaining nose 63a, 63b oriented towards the inside to prevent these wires from exiting the inside space. Of course, any other equivalent tie shape may be suitable. The ties 60 are preferably made of a photodegradable synthetic material, assembled in strips by means of small cleavable connecting pins, being specified that any other material may be suitable.

The tying head 72 comprises a fitting area 74 for the tie 60, arranged in the extension of the receiving area 73, this fitting area 74 comprising an opening 75 to allow the introduction of the tying-up wires 50 in the inside space 61a, 61b of the tie 60. This opening 75 is oriented towards the insertion head 82 of the other arm 8. The tying head 72 comprises a beveled or chamfered end 76 able to cooperate with the complementary beveled or chamfered end 86 of the insertion head 82, as shown schematically on FIG. 4, to facilitate their overlap and the introduction of the tying-up wire 50 guided by the arm 8 in the tie 60. To that purpose, the arms 7, 8 carry wire guides 87, 87 equipped or not with tensioning devices arranged on the path of the tying-up wires 50 to control their guidance and tension.

The tying head 72 also comprises a knife 77 or pusher, aligned with the reception area 73 and the fitting area 74, this knife 77 being coupled to an actuating mechanism 9 in order to be moved between a passive position, in which it is arranged upstream of the receiving area 73 (see FIG. 7, and FIG. 3—arm 7 waiting position) in order to be located behind the tie 60 contained in this receiving area 73, and an active position, in which it lies at least partly in the receiving area 73 (see FIG. 3—arm 7 working position) and in which it has moved the tie 60 from the receiving area 73 to the fitting area 74. To that purpose, the tying head 72 comprises inside grooves 78 allowing to guide the knife 77 and the tie 60 in translation.

Figure 3:
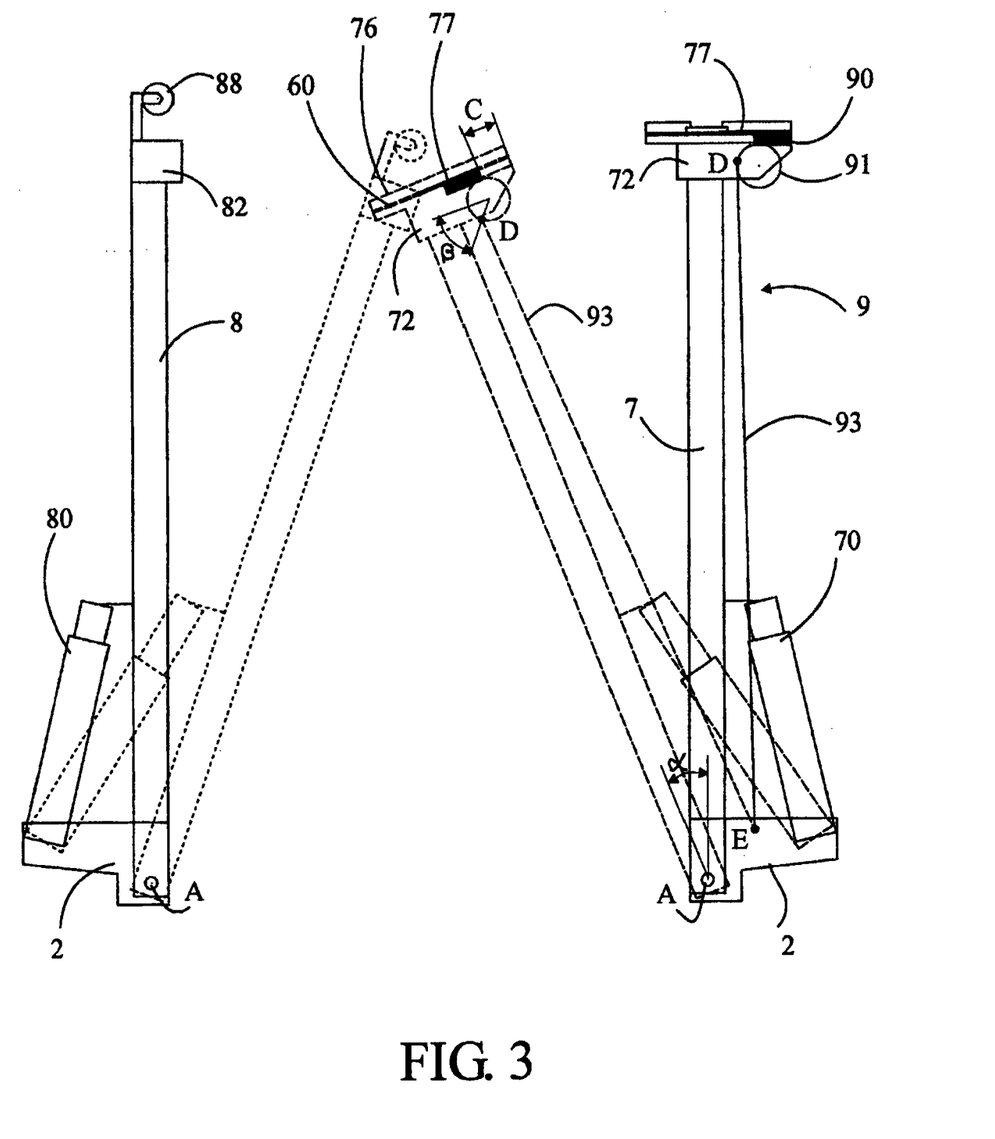
FIG. 3 is a top view of the tying arms, in waiting position and in working position.
Figures 4, 5A, 5B:
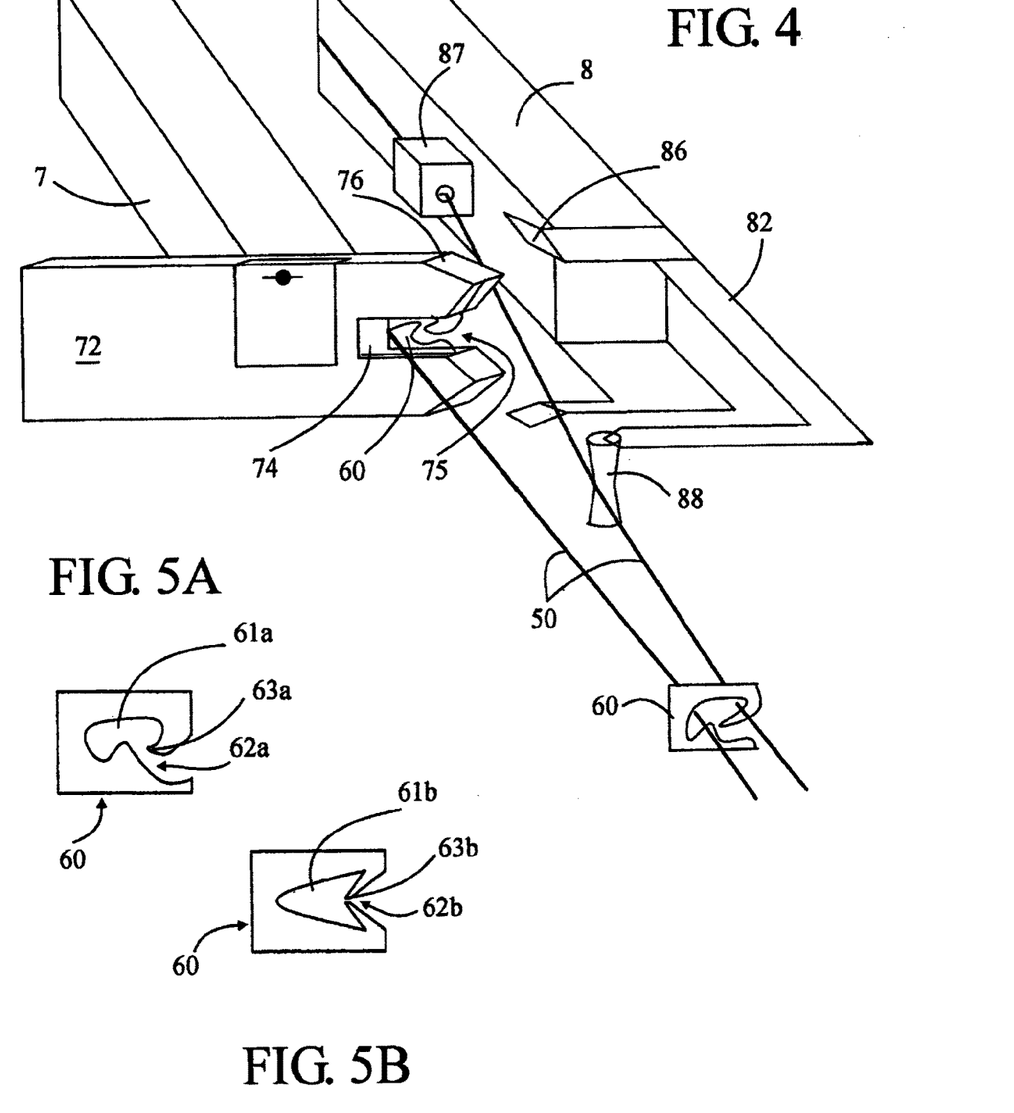
FIG. 4 is a perspective view showing the end of the tying arms in the tying phase.
FIGS. 5A and 5B show two types of ties that may be used in the machine of the invention.
Figure 6:
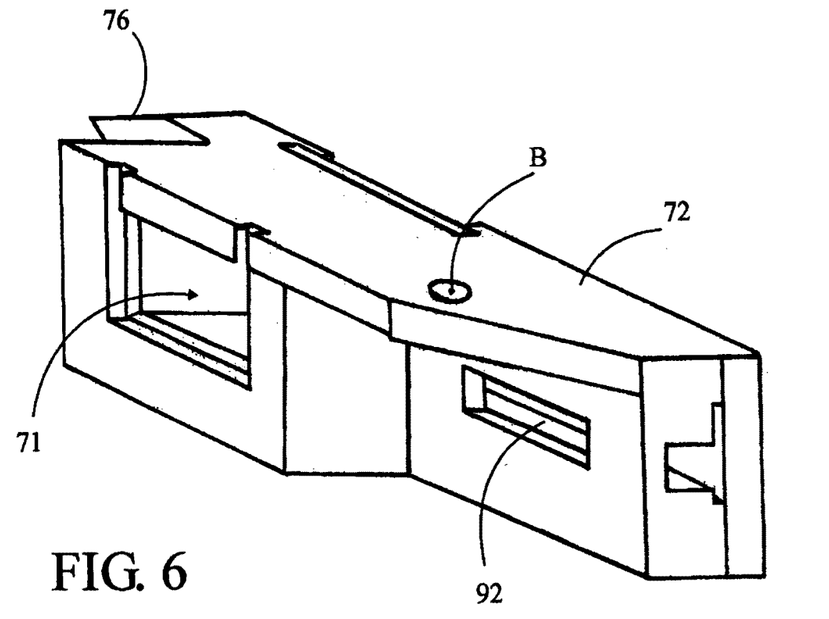
FIG. 6 is a perspective view of the head of the tying arm.
Figure 7:
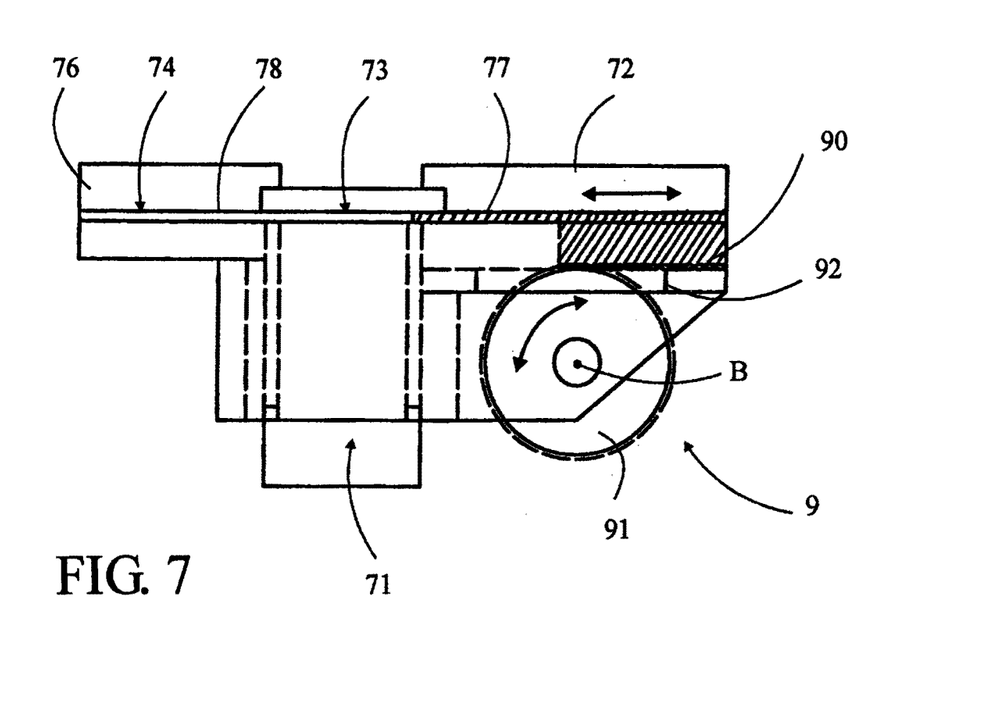
FIG. 7 is a top view of the head of FIG. 6.

In the example represented in FIG. 3, the actuating mechanism 9 is actuated thanks to the movement of the arm 7 controlled by its jack 70. This actuating mechanism 9 comprises a rack 90 that is firmly attached to the knife 77, engaging a pinion 91 mounted so as to be able to rotate in the tying head 72 around a rotational axis B, this pinion 91 being in communication with the rack 90 through a window 92 located in the tying head 72. This actuating mechanism 9 also comprises an actuating rod 93 with a fixed length, connected at one of its ends with the pinion 91 at a point D out of center with respect to the axis of rotation B of the pinion 91, and, at the other end, with a fixed point E different from the pivoting axis A of the arm 7, so that the pivoting of the arm 7 by an angle α (alpha) generates the rotation of the pinion 91 by an angle β (beta), which leads to the translation movement of the knife 77 with a stroke C. This movement is totally reversible. The arms comprise wire guides arranged to guide and position the tying-up wires with respect to the tying and insertion heads.

The tie magazine 71 comprises pushing means 6 for pushing the strip of ties 60 in direction of the receiving area 73, which may have different forms. Considering the length of the magazine 71 and thus the stroke required for these pushing means 6, one of the solutions consists in using a pulley and cable technique combined with a counterweight, which has the advantage of applying a constant thrust on the strip of ties 60, whatever the length of the strip. In reference more specifically to FIGS. 8 and 9, these pushing means 6 comprise a pusher 65 housed in the magazine 71 behind the strip of ties 60 and a system with pulleys 66 and a cable 67, one end of the cable 67 being fixed on the pusher 65 and the other end of the cable carrying a counterweight 68 housed in one of the columns of the gantry 2. Of course, any other pushing means may be suitable.

This description shows clearly that the invention allows reaching the goals defined, that is to say a simple, reliable and guaranteed tying system, loaded on one of the arms allowing to bind the tying-up wires, while this tying system can be controlled by the operator, or even pre-programmed, in function of the forward movement of the tractor, the control means of the various actuators belonging to the current practice for a person skilled in the art.

The present invention is not restricted to the example of embodiment described, but extends to any modification and variant which is obvious to a person skilled in the art while remaining within the scope of the protection defined in the attached claims.

The invention claimed is:

1. A machine (1) for tying at least one of plants, vines and raspberry branches, the machine (1) comprising:
    means (4) for lifting up the at least one of plants, vines and branches,
    means (5) for supplying tying-up wires (50), and
    binding means (7, 8) for binding the tying-up wires, the binding means including two pivoting arms (7, 8) mounted around approximately vertical pivoting axes (A), the arms being coupled to driving means (70, 80) so as to be movable from a waiting position, in which at least their ends are spaced apart, to a working position, in which the ends are brought together and arranged to fit a tie (60) on the tying-up wires (50),
    wherein a first of the two arms (7) comprises a tying head (72) that is fixed to the first of the two arms, the tying head (72) supports a tie magazine (71) that is fixed to the first of the two arms and arranged in an extension of the tying head (72), and a second of the two arms (8) includes an insertion head (82) arranged to cooperate with the tying head (72), when the two arms (7, 8) are in the working position, to place the tie (60) on the tying-up wires (50).

2. The machine according to claim 1, wherein the tying head (72) comprises a receiving area (73) for the tie (60) in communication with the tie magazine (71), followed by a fitting area (74) of the tie (60), and a pushing knife (77) fixed to the first of the two arms and aligned with the receiving and the fitting areas (73, 74), the pushing knife is coupled to an actuating mechanism (9) fixed to the first of the two arms so as to be movable between a passive position, in which it lies upstream of the receiving area (73) behind the tie (60), and an active position, in which it lies at least partly in the receiving area (73) to push the tie (60) from the receiving area (73) to the fitting area (74).

3. The machine according to claim 2, wherein the actuating mechanism (9) of the pushing knife (77) is actuated by pivoting the first of the two arms (7).

4. The machine according to claim 3, wherein the actuating mechanism (9) comprises a rack (90) that is firmly attached to the pushing knife (77), engaging a pinion (91), and an actuating rod (93) connected at one of its ends with the pinion (91) at a point (D) out of center with respect to an axis of rotation (B) of the pinion, and, at another end, with a fixed point (E) different from the pivoting axis (A) of the first of the two arms (7), so that pivoting of the first of the two arms (7) generates the translation of the pushing knife (77) to push the tie (60) from the receiving area (73) to the fitting area (74).

5. The machine according to claim 2, wherein the first and the second arms (7, 8) comprise wire guides (87, 88) arranged to guide and position the tying-up wires (50) with respect to the tying head (72) and the insertion head (82).

6. The machine according to claim 2, wherein the tie magazine (71) comprises pushing means (6) for pushing the ties (60) in a direction of the receiving area (73), and the pushing means (6) is arranged to apply an approximately constant thrust on the ties (60).

7. The machine according to claim 6, wherein the pushing means (6) comprise a pusher (65) housed in the magazine (71) behind the ties (60) and a system with pulleys (66) and a cable (67), and one end of the cable is fixed on the pusher (65) and the other end of the cable carrying a counterweight (68).

8. A machine (1) for tying at least one of plants, vines, and raspberry branches, the machine (1) comprising:
    a lifting apparatus (4) for lifting up the at least one of plants, vines, and branches,
    a feed mechanism (5) for supplying tying-up wires (50),
    a binding assembly (7, 8) for binding the tying-up wires, the binding assembly including first and second arms (7, 8), one end of each of the first and the second arms is mounted so as to pivot around approximately vertical pivoting axes (A),
    the first and the second arms are coupled to actuators (70, 80) which bias the first and the second arms so as to pivot about the respective vertical pivoting axis between a waiting position and a working position,
    remote ends of the first and the second arms are spaced from each other when the first and the second arms are in the waiting position,
    in the working position, the remote ends of the first and the second arms are brought together and arranged so as to fit a tie (60) on the tying-up wires (50),
    a tying head (72) is fixed to the remote end of the first arm (7) and the tying head (72) retains an on-board tie magazine (71) that is fixed to the first arm,
    an insertion head (82) is fixed to the remote end of the second arm (8), and
    the tying head (72) cooperates with the insertion head (82) to position the tie (60) on the tying-up wires (50) when the first and the second arms (7, 8) are pivoted into the working position.

9. The machine according to claim 8, wherein the tying head (72) comprises a receiving area (73) and a fitting area (74), the tie magazine (71) is aligned with the receiving area (73) such that the ties (60) arranged in the tie magazine (71) are sequentially received within the receiving area (73), a pushing knife (77) is slidably supported within the tying head and is linearly aligned with the receiving and the fitting areas (73, 74), the pushing knife (77) engages an actuating mechanism (9) which slides the pushing knife (77) between a passive position, in which the pushing knife (77) is located on a linear side of the receiving area (73) opposite the fitting area, and an active position, in which the pushing knife (77) is at least partially located within the receiving area (73), such that when sliding from the passive position to the active position, the pushing knife (77) biases the tie (60) linearly from the receiving area (73) to the fitting area (74).

10. The machine according to claim 9, wherein the actuating mechanism (9) is supported by the first arm such that pivoting movement of the first arm actuates the actuating mechanism which biases the pushing knife (77) linearly between the passive position and the active position.

11. The machine according to claim 9, wherein the actuating mechanism (9) comprises a rack (90) that is firmly attached to the pushing knife (77) and engages a pinion (91), and an actuating rod (93) that is connected at one end with the pinion (91) at a point (D) on the pinion that is out of center with respect to a rotational axis (B) of the pinion, and an opposite end of the actuating rod is connected at a fixed point (E) that is spaced from the vertical pivoting axis (A) of the first arm, such that pivoting movement of the first arm (7) facilitates sliding movement of the pushing knife (77) from the passive position to the active position.

12. The machine according to claim 8, wherein the first and the second arms (7, 8) comprise wire guides (87, 88) that are arranged to guide and position the tying-up wires (50) with respect to the tying head (72) and the insertion head (82).

13. The machine according to claim 8, wherein the tie magazine (71) comprises a pusher assembly (6) which abuts the ties (60) and pushes the ties in a direction that is normal to the linear alignment of the fitting area, the receiving area (73) and the pushing knife (77), the pusher assembly (6) is arranged to apply an approximately constant thrust on the ties (60).

14. The machine according to claim 13, wherein the pusher assembly (6) is housed in the tie magazine (71) behind the ties (60) and comprises a pusher, pulleys (66) and a cable (67), one end of the cable is fixed to the pusher (65) and an opposite end of the cable couples a counterweight (68) which biases the pusher and pushes the ties.

15. The machine according to claim 8, wherein the feed mechanism (5) is coupled to a tractor such that, as the tractor advances during operation, the feed mechanism (5) automatically uncoils tying-up wires (50) as a result of traction of the tractor.

\* \* \* \* \*